(12) United States Patent
Favaloro

(10) Patent No.: US 12,528,259 B2
(45) Date of Patent: Jan. 20, 2026

(54) AUTOMATED TAPE LAYERING FOR CONICAL COMPOSITE COMPONENTS

(71) Applicant: Textron Systems Corporation, Hunt Valley, MD (US)

(72) Inventor: Michael Robert Favaloro, Amesbury, MA (US)

(73) Assignee: Textron Systems Corporation, Hunt Valley, MD (US)

( * ) Notice: Subject to any disclaimer, the term of this patent is extended or adjusted under 35 U.S.C. 154(b) by 79 days.

(21) Appl. No.: 18/197,331

(22) Filed: May 15, 2023

(65) Prior Publication Data

US 2023/0415427 A1    Dec. 28, 2023

Related U.S. Application Data

(60) Provisional application No. 63/355,160, filed on Jun. 24, 2022.

(51) Int. Cl.
*B29C 70/38*     (2006.01)
*B29C 70/32*     (2006.01)
(Continued)

(52) U.S. Cl.
CPC ............ *B29C 70/388* (2013.01); *B29C 70/32* (2013.01); *B29K 2105/089* (2013.01);
(Continued)

(58) Field of Classification Search
CPC ....... B29C 70/32; B29C 70/388; B29C 70/30; B29C 70/386; B29C 53/584; B29C 53/566; B29C 53/581; B29C 53/585; B29C 53/565; B29C 53/68; B29C 53/70; B29C 66/92; B29C 66/922; B29C 66/9221; B29C 66/92211; B29C 66/9231; B29C 66/92311; B29C 66/924; B29C 66/9241; B29C 66/92431; B29C 66/9261;
(Continued)

(56) References Cited

U.S. PATENT DOCUMENTS

| | | | | |
|---|---|---|---|---|
| 3,095,156 | A * | 6/1963 | Warnken | B29C 70/545 |
| | | | | 156/425 |
| 3,402,085 | A * | 9/1968 | Trimble | B29C 53/665 |
| | | | | 428/137 |
| 5,876,544 | A * | 3/1999 | Yamamoto | A63B 60/42 |
| | | | | 242/444 |
| 6,799,619 | B2 | 10/2004 | Holmes et al. | |

(Continued)

FOREIGN PATENT DOCUMENTS

WO      2008149004      12/2008

*Primary Examiner* — John L Goff, II
(74) *Attorney, Agent, or Firm* — BainwoodHuang

(57) ABSTRACT

Techniques for providing a conical composite involve receiving a starting portion of a tape from a tape supply, the tape having a first tape edge and a second tape edge. The techniques further involve positioning the starting portion of the tape in contact with a conical tool structure. The techniques further involve, after the starting portion of the tape is positioned in contact with the conical tool structure, maneuvering at least one of (i) a tape deployment head relative to the conical tool structure and (ii) the conical tool structure relative to the tape deployment head to deploy the tape around the conical tool structure with the first tape edge adjacent to conical tool structure and the second tape edge extending outwardly from the conical tool structure to form the conical composite.

8 Claims, 16 Drawing Sheets

(51) Int. Cl.
    *B29K 105/08*     (2006.01)
    *B29L 31/00*     (2006.01)
    *B29L 31/30*     (2006.01)
    *B64C 1/38*     (2006.01)

(52) U.S. Cl.
    CPC .................. *B29L 2031/3082* (2013.01); *B29L 2031/7724* (2013.01); *B64C 1/38* (2013.01)

(58) Field of Classification Search
    CPC ......... B29C 66/92611; B29C 66/92613; B29L 2031/7724; B29L 2031/3082; B29K 2105/089; B64C 1/38; B64C 2001/0072; B64G 1/58; B64G 1/002; B64G 1/226; F24B 15/34; B64F 5/10
    USPC .................................................... 156/189, 64
    See application file for complete search history.

(56) References Cited

U.S. PATENT DOCUMENTS

| | | |
|---|---|---|
| 7,080,441 B2 | 7/2006 | Braun |
| 7,083,698 B2 | 8/2006 | Engwall et al. |
| 7,093,638 B2 | 8/2006 | Warek |
| 7,293,590 B2 | 11/2007 | Martin |
| 7,819,160 B2 | 10/2010 | Hamlyn et al. |
| 8,003,034 B2 | 8/2011 | Oldani et al. |
| 8,052,819 B2 | 11/2011 | Munaux et al. |
| 8,336,596 B2 | 12/2012 | Nelson et al. |
| 9,884,472 B2 | 2/2018 | Mccowin |
| 10,562,242 B2 | 2/2020 | Martin et al. |
| 11,247,414 B2 | 2/2022 | Li et al. |
| 2006/0152712 A1* | 7/2006 | Engelbart .......... G01N 21/8806 356/237.1 |
| 2022/0242069 A1* | 8/2022 | Dunn ...................... B29C 70/42 |

* cited by examiner

AUTOMATED TAPE LAYERING FOR CONICAL COMPOSITE COMPONENTS

BACKGROUND

A typical nose cone is conical in shape to minimize aerodynamic drag. Such a nose cone may be used on vehicles, missiles, rockets, and the like.

Some nose cones may be fitted with heatshields. Such heatshields provide protection against extreme heat created by air friction/resistance.

SUMMARY

A conventional approach to creating a heatshield involves manually wrapping carbon-phenolic material (e.g., carbon fibers impregnated with phenolic resin) around a cylinder to build up the part. Along these lines, a human operator places the material flat onto the cylinder to run circumferentially around the cylinder, and then guides the material around the cylinder over and over itself.

Unfortunately, there are deficiencies to this manually intensive process. For example, it is not practical to use this process to create tape wrapped heatshields having wall thicknesses that are greater than about an inch even though it may be useful to provide heatshields multiple times greater for certain hypersonic applications. Additionally, the heatshields that are created are typically non-uniform and are prone to delamination due to the operator's inability to consistently apply pressure, etc. particularly when using certain prepreg materials.

In contrast to the above-described conventional approach to creating a heatshield, improved techniques involve modified (or enhanced) automated tape layering (ATL) of a tape over a conically shaped tool structure (e.g., a template or form). With this modified ATL process, high tape placement precision, consistent pressures, and tape steering are achievable. Such techniques may deploy the tape over the tool to create an object such as a conical heatshield. Along these lines, such techniques enable one edge of the tape to be precisely laid directly in contact with (or adjacent to) a tapered section of the tool such that multiple layers may be built with the other edge of the tape facing outward from the tool. Accordingly, such techniques enable creation of substantially thicker heatshields and/or other objects with improved uniformity and quality.

With features provided by modified ATL such as high tape placement precision, consistent pressures, and tape steering, manufacture of conical composite components having high quality and consistency are now achievable. Along these lines, the capabilities of ATL are now expanded beyond simply using ATL on flat areas and cylindrical objects.

One embodiment is directed to a method of providing a heatshield. The method includes receiving a starting portion of a tape from a tape supply, the tape having a first tape edge and a second tape edge. The method further includes positioning the starting portion of the tape in contact with a conical tool structure. The method further includes, after the starting portion of the tape is positioned in contact with the conical tool structure, maneuvering at least one of (i) a tape deployment head relative to the conical tool structure and (ii) the conical tool structure relative to the tape deployment head to deploy the tape around the conical tool structure with the first tape edge adjacent to conical tool structure and the second tape edge extending outwardly from the conical tool structure to form the heatshield.

Another embodiment is directed to a heatshield formed by a method of:
(A) receiving a starting portion of a tape from a tape supply, the tape having a first tape edge and a second tape edge;
(B) positioning the starting portion of the tape in contact with a conical tool structure; and
(C) after the starting portion of the tape is positioned in contact with the conical tool structure, maneuvering at least one of (i) a tape deployment head relative to the conical tool structure and (ii) the conical tool structure relative to the tape deployment head to deploy the tape around the conical tool structure with the first tape edge adjacent to conical tool structure and the second tape edge extending outwardly from the conical tool structure to form the heatshield.

Yet another embodiment is directed to heatshield equipment which includes a conical tool structure, a tape deployment head constructed and arranged to deploy tape relative to the conical tool structure, and a tape controller coupled with the conical tool structure and the tape deployment head. The tape controller is constructed and arranged to:
(A) receive a starting portion of a tape from a tape supply, the tape having a first tape edge and a second tape edge,
(B) position the starting portion of the tape in contact with a conical tool structure, and
(C) after the starting portion of the tape is positioned in contact with the conical tool structure, maneuver at least one of (i) the tape deployment head relative to the conical tool structure and (ii) the conical tool structure relative to the tape deployment head to deploy the tape around the conical tool structure with the first tape edge adjacent to conical tool structure and the second tape edge extending outwardly from the conical tool structure to form the heatshield.

In some arrangements, the tape controller includes:
(i) a robotic assembly coupled with at least one of the tape deployment head and the conical tool structure, and
(ii) control circuitry coupled with the robotic assembly, the control circuitry being constructed and arranged to direct the robotic assembly to robotically move the conical tool structure and the tape deployment head relative to each other as the tape deployment head deploys the tape onto the conical tool structure.

In some arrangements, the tape controller further includes a set of sensors constructed and arranged to provide a set of sensing signals indicating current position of the conical tool structure and the tape deployment head relative to each other.

In some arrangements, the control circuitry, when robotically moving the conical tool structure and the tape deployment head relative to each other, is constructed and arranged to apply, based on the set of sensing signals, the tape under pressure to form the heatshield.

In some arrangements, the conical tool structure is conical about a central axis. Additionally, a first cross-section through a first portion of the conical tool structure has a first width, the first cross-section being perpendicular to the central axis. Furthermore, a second cross-section through a second portion of the conical tool structure has a second width that is different from the first width, the second cross-section being perpendicular to the central axis. Also, positioning the starting portion of the tape in contact with the conical tool structure includes placing the starting portion of the tape in contact with the first portion of the conical tool structure.

In some arrangements, the second width is narrower than the first width. Additionally, maneuvering includes forming layers of the tape that wrap around the conical tool structure and extend from the first portion to the second portion.

In some arrangements, the conical tool structure further includes a sloped portion that defines an incline from the first portion. Additionally, forming the layers includes orienting the layers at the incline defined by the sloped portion of the conical tool structure.

In some arrangements, orienting the layers at the incline includes layering the tape at a pitch within the range of 100 degrees and 125 degrees from the central axis. For example, the layers may be angled at 112.5 degrees from the central axis (i.e., at a 22.25 degree pitch from a plane that is perpendicular to the central axis). Other angular deflections are suitable as well.

In some arrangements, the tape includes fibers arranged in a bias pattern. Additionally, forming the layers includes positioning the layers with the fibers extending outwardly from the conical tool structure in non-radial directions.

In some arrangements, the tape includes pre-impregnated material. Additionally, forming the layers includes positioning the first edge of the tape in contact with the conical tool structure and pressing the layers into contact with each other to promote pre-impregnated material bonding.

In some arrangements, positioning the starting portion of the tape in contact with the conical tool structure includes moving the tape deployment head which is loaded with the starting portion of the tape toward the conical tool structure to deposit the starting portion of the tape onto the conical tool structure.

In some arrangements, maneuvering includes robotically moving the conical tool structure and the tape deployment head relative to each other to guide the tape around the conical tool structure.

In some arrangements, robotically moving the conical tool structure and the tape deployment head relative to each other includes:
   (i) receiving a set of sensing signals indicating current position of the conical tool structure and the tape deployment head relative to each other, and
   (ii) based on the set of sensing signals, applying the tape under pressure to form the heatshield.

Other embodiments are directed to apparatus, devices, and related componentry. Some embodiments are directed to various vehicles, equipment, tools, systems, sub-systems, methods, and so on, which involve automated tape layering for conical composite components.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves modified automated tape layering (ATL) of a tape over a conically shaped tool structure (e.g., a template or form). With this modified ATL process, high tape placement precision, consistent pressures, and tape steering are achievable. Such techniques may deploy the tape over the tool to create a conical composite component such as a conical heatshield. Along these lines, such techniques enable one edge of the tape to be precisely laid directly in contact with the tool such that multiple layers may be built with the other edge of the tape facing outward from the tool. Accordingly, such techniques enable creation of substantially thicker heatshields and/or other objects with improved uniformity and quality.

With features provided by modified ATL such as high tape placement precision, consistent pressures, and tape steering, manufacture of conical composite components such as heatshields having high quality and consistency are now achievable. That is, the capabilities of ATL are now enhanced beyond simply using ATL on flat areas and cylindrical objects.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
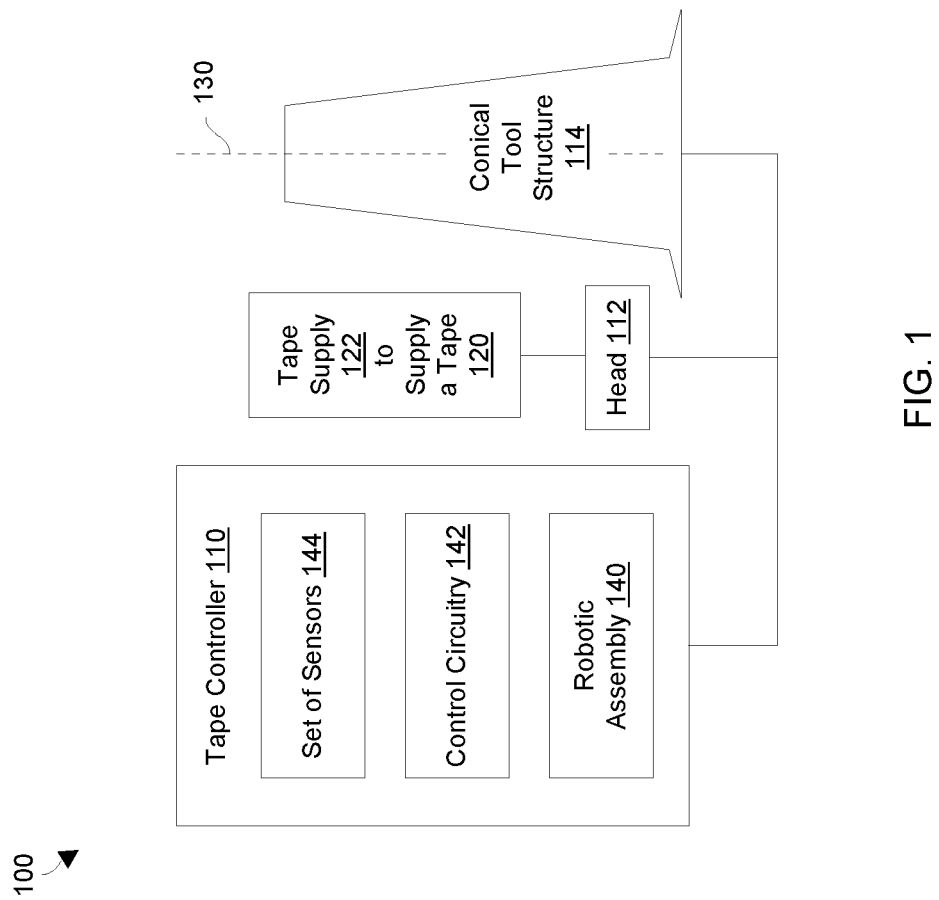
FIG. 1 is a perspective view of example equipment which is suitable for performing modified automated tape layering (ATL) of a tape over a conically shaped tool structure in accordance with certain embodiments.

FIG. 1 shows example equipment 100 that performs modified ATL of a tape over a conically shaped tool in accordance with certain embodiments. The equipment 100 includes a tape controller 110, a tape deployment head 112, and a conical tool structure 114.

The tape controller 110 is constructed and arranged to control deployment of a tape 120 from a tape supply 122. Along these lines, the tape controller 110 is able to maneuver at least one of (i) the tape deployment head 112 relative to the conical tool structure 114 and (ii) the conical tool structure 114 relative to the tape deployment head 112 to deploy the tape 120 around the conical tool structure 114. As will be explained in further detail shortly, the tape controller 110 is able to effectuate wrapping of the tape 112 about a central axis 130 defined by the conical tool structure 114 with a first tape edge adjacent to a conical portion of the conical tool structure 114 and the second tape edge extending outwardly from the conical portion of the conical tool structure 114 (e.g., outwardly or away from the central axis 130) to form a conical component.

The tape deployment head 112 is constructed and arranged to directly deploy the tape 120 relative to the conical tool structure 114. That is, under guidance from the tape controller 110, the tape deployment head 112 places (or deposits/applies/locates) the tape 120 from the tape supply 122 around the conical tool structure 114. As will be explained in further detail shortly, new tape is layered onto earlier placed tape thereby forming a stack of layers (or simply layers). Such placement of the tape 120 is automated to ensure proper positioning, orienting, compaction, and so on.

The tape supply 122 is constructed and arranged to supply the tape 120 to the tape deployment head 112 for deployment. For example, the tape supply 122 may include a spool from which the tape 120 is unwound as the tape 120 is deployed around the conical tool structure 114. In some arrangements, the tape supply 122 may include certain environmental control systems to maintain (or preserve) the tape 120 in a particular state (e.g., within a predefined temperature range, at a certain humidity, combinations thereof, etc.) to prevent premature curing, to optimize bonding between layers after deployment, etc.

The conical tool structure 114 is constructed and arranged to serves as a foundational form or base onto and around which the tape 120 is layered. Along these lines, to create a conical heatshield, the conical tool structure 114 may define the shape of a portion of apparatus to eventually be protected via the heatshield (e.g., a nose or belly of a vehicle, a missile, a rocket, a nozzle, etc.).

In some arrangements, the tape controller 110 includes a robotic assembly 140 which couples with at least one of the tape deployment head 112 and the conical tool structure 114. Accordingly, the robotic assembly 140 is able to maneuver the tape deployment head 112 and the conical tool structure 114 relative to each other for robust and reliable tape placement/application.

In some arrangements, the tape controller 110 includes control circuitry 142 coupled with the robotic assembly 140. The control circuitry 142 is constructed and arranged to direct the robotic assembly 140 to robotically move the conical tool structure 114 and the tape deployment head 112 relative to each other as the tape deployment head 112 deploys the tape 120 onto the conical tool structure 114.

In some arrangements, the tape controller 110 includes a set of sensors 144 constructed and arranged to provide a set of sensing signals to the control circuitry 142 (e.g., for feedback during tape deployment). The set of sensing signals indicate current position of the conical tool structure 114 and the tape deployment head 112 relative to each other. Along these lines, the set of sensors 144 may perform optical sensing, temperature sensing, humidity sensing, pressure sensing, tension sensing, combinations thereof, and so on. Accordingly, the tape controller 110 is able to ensure accurate deployment (e.g., positioning, orientation, alignment, etc.) of the tape 120, correct tape compaction in accordance with pressure and time requirements, tension, and so on. Further details will be provided with reference to FIGS. 2 and 3.

Figure 2:
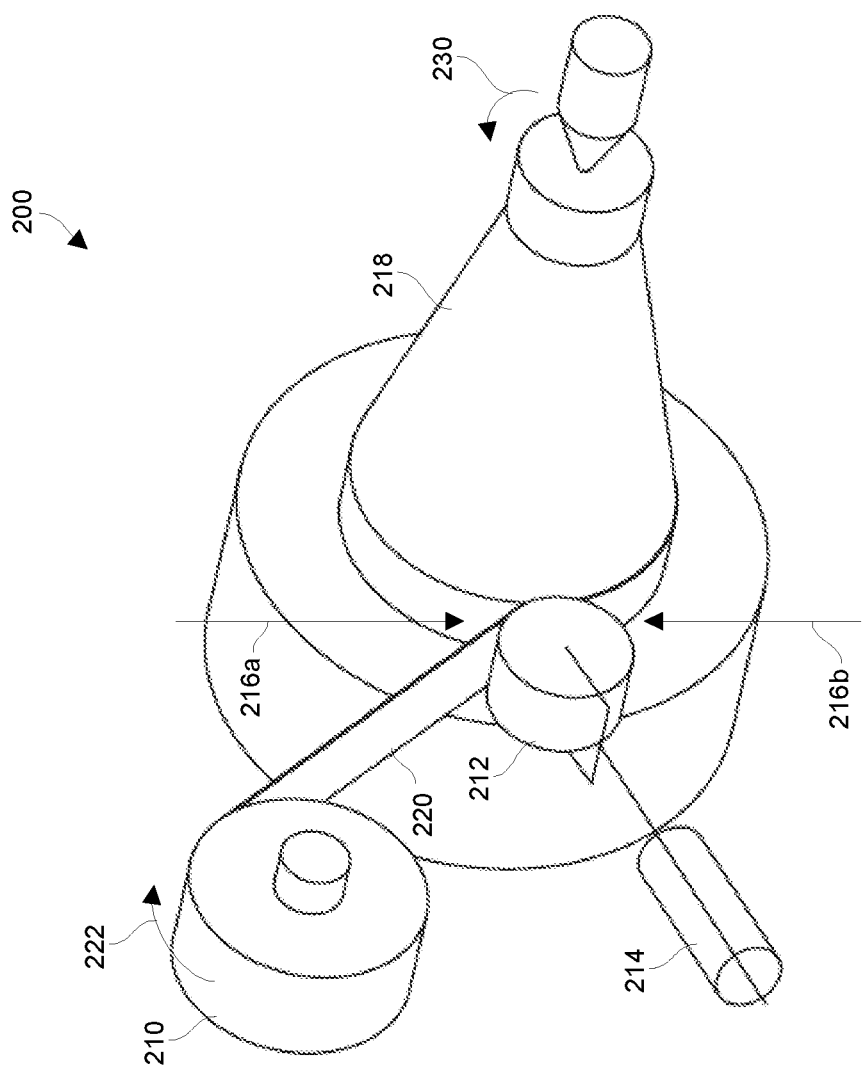
FIG. 2 is a perspective view of some example ATL componentry in accordance with certain embodiments.
Figure 3:
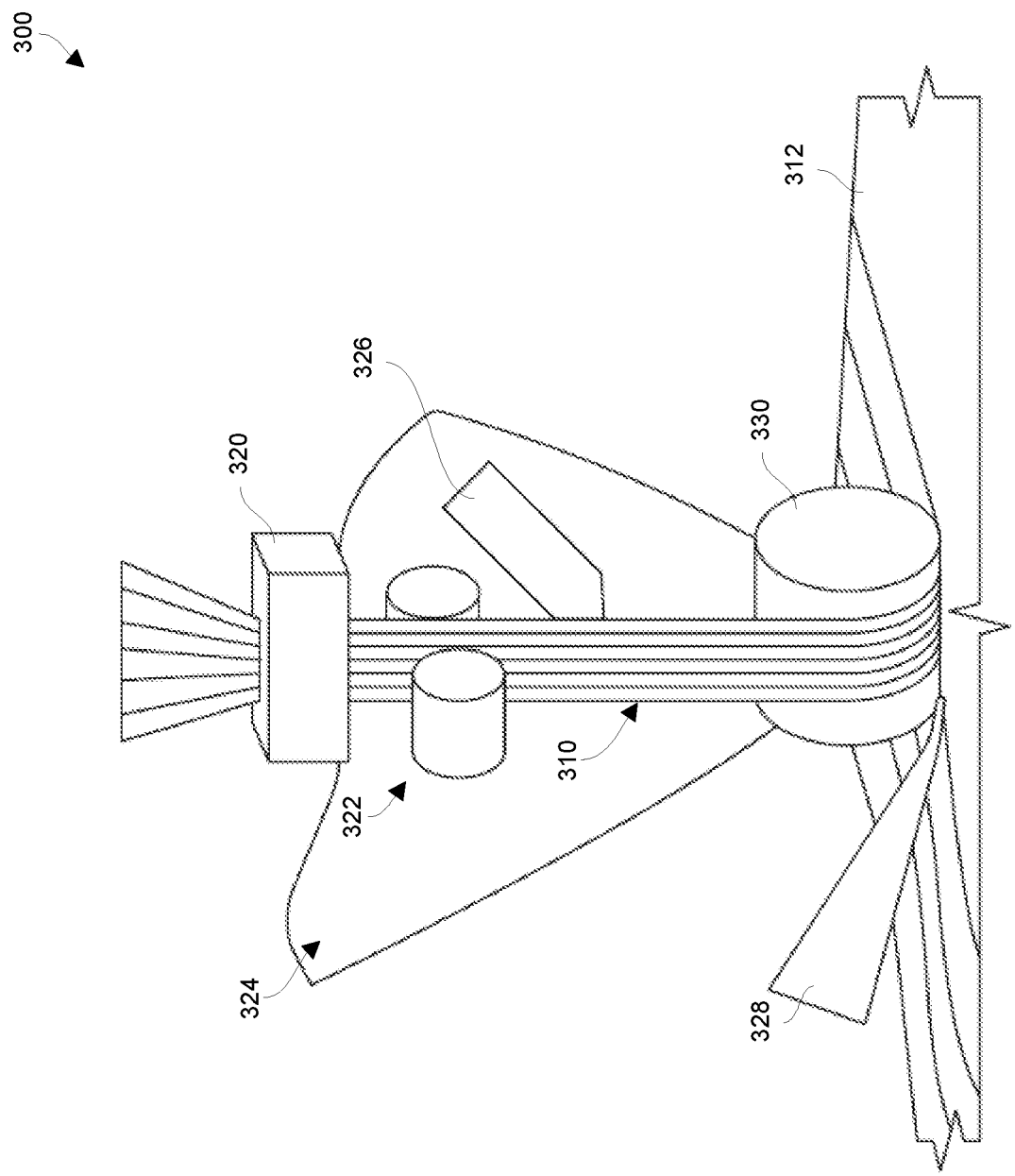
FIG. 3 is a perspective view of certain example ATL componentry in accordance with certain embodiments.

FIGS. 2 and 3 show various ATL componentry details, some of which are suitable for use by the equipment 100 (also see FIG. 1) in accordance with certain embodiments. FIG. 2 shows a tape wrapping assembly 200 that applies tape on a horizontal rotating bed. FIG. 3 shows a tape laying assembly 300 that lays runs (or strips) of tape in a side-by-side or partially overlapping manner.

As shown in FIG. 2, the tape wrapping assembly 200 includes a tape supply 210, a head 212, a set of actuators (or robotics) 214 (depicted as object 214 for simplicity), environmental controls 216a, 216b (illustrated via arrows 216a, 216b), and a mandrel 218. One or more of these components may form at least a portion of the equipment 100 that is capable of performing modified ATL (also see FIG. 1).

It should be appreciated that the above-identified componentry for the tape wrapping assembly 200 may be more complex than that which is shown in FIG. 2. It should be further appreciated that the componentry may include other apparatus/devices (more components, fewer components, different components, etc.) than that which is shown in FIG. 2. For example, the set of actuators/robotics 214 may include one or more arms, effectors/manipulators, other types of actuators/articulators, combinations thereof, and so on.

During operation, a tape 220 unwinds from the tape supply 210 in a direction 222. As the tape 220 unwinds, the head 212 receives the tape 220 under tension and presses the tape 220 flat toward a bed (or cylindrical portion) of the mandrel 218 while the mandrel 218 rotates in the direction 230. Accordingly, the tape 220 winds over and over itself and around the mandrel 218.

During such operation, the environmental controls 216a, 216b provide the tape 220 with conditions that promote proper adhesion, bonding, curing, etc. For example, the environmental control 216a may provide hot air that increases the tackiness of the tape sides facing each other just before the tape 220 is compacted by the head 212. Additionally, the environmental control 216b may provide cooling following compaction to promote curing.

Additionally, as shown in FIG. 3, the tape laying assembly 300 includes various components and devices that prepare a tape 310 for laying onto a surface 312. Such components may include a band collimator 320 (e.g., a device that aligns/focuses a payout of tape material with controlled tension), a set of rollers 322 (e.g., one or more tow restart rollers), a placement head 324, a tow cutter/clamper device 326, a heat controller 328, and a compaction roller 330. One or more of these components may form at least a portion of the equipment 100 that is capable of performing modified ATL (also see FIG. 1).

It should be appreciated that the above-identified componentry for the tape laying assembly 300 may be more complex than that which is shown in FIG. 3. It should be further appreciated that the componentry may include other apparatus/devices (more components, fewer components, different components, etc.) than that which is shown in FIG. 3.

During operation, the tape laying assembly 300 lays runs of the tape 310 onto the surface 312. The lengths of the runs are controlled by the tow cutter/clamper device 326. Along these lines, the tape 310 may include multiple fibers that extend lengthwise within the tape 310, and the tow cutter/clamper device 326 is able to effectively divide the tape 310 into individual runs as shown in FIG. 3.

Moreover, positioning of the compaction roller 330 over the surface 312 may be controlled by robotics (e.g., see the set of actuators/robotics 214 in FIG. 2). Such robotics may include electro-mechanically controlled arms, effectors/manipulators, other types of actuators/articulators, combinations thereof, etc.

Although the runs of tape 310 are laid flat onto the surface 312, the tape laying assembly 300 is able to guide the runs to form an overlapping (or shingled) pattern. In particular, an edge of each new run may overlap a previously laid run.

The other componentry further facilitates laying of the tape 310. For example, the heat controller 328 heats the tape 310 to improve bonding, the compaction roller 330 provides proper tension and applies appropriate pressure onto the tape 310, and so on. Further details will now be provided with reference to FIGS. 4 through 7.

FIGS. 4 through 7 show various views 400, 500, 600, and 700 of a portion of the equipment 100 (also see FIG. 1) when beginning performance of a modified ATL process over a conically shaped tool in accordance with certain embodiments. Certain componentry may have been omitted from FIGS. 4 through 7 to highlight or better show other details.

As shown in FIGS. 4 through 7, the conical tool structure 114 of the equipment 100 includes a lower sloped portion 410 and an elongated tapered portion 412. The lower sloped portion 410 provides a base surface (or footing) onto which the tape 120 may be initially applied. The elongated tapered portion 412 defines the central axis 130 in the positive Y-direction and a predefined conical shape. For example, in the context of making a heatshield for a conical structure such as a vehicle, missile, or rocket, etc., the elongated tapered portion 412 may define a portion of the conical structure that will be protected by the heatshield.

Figure 5:
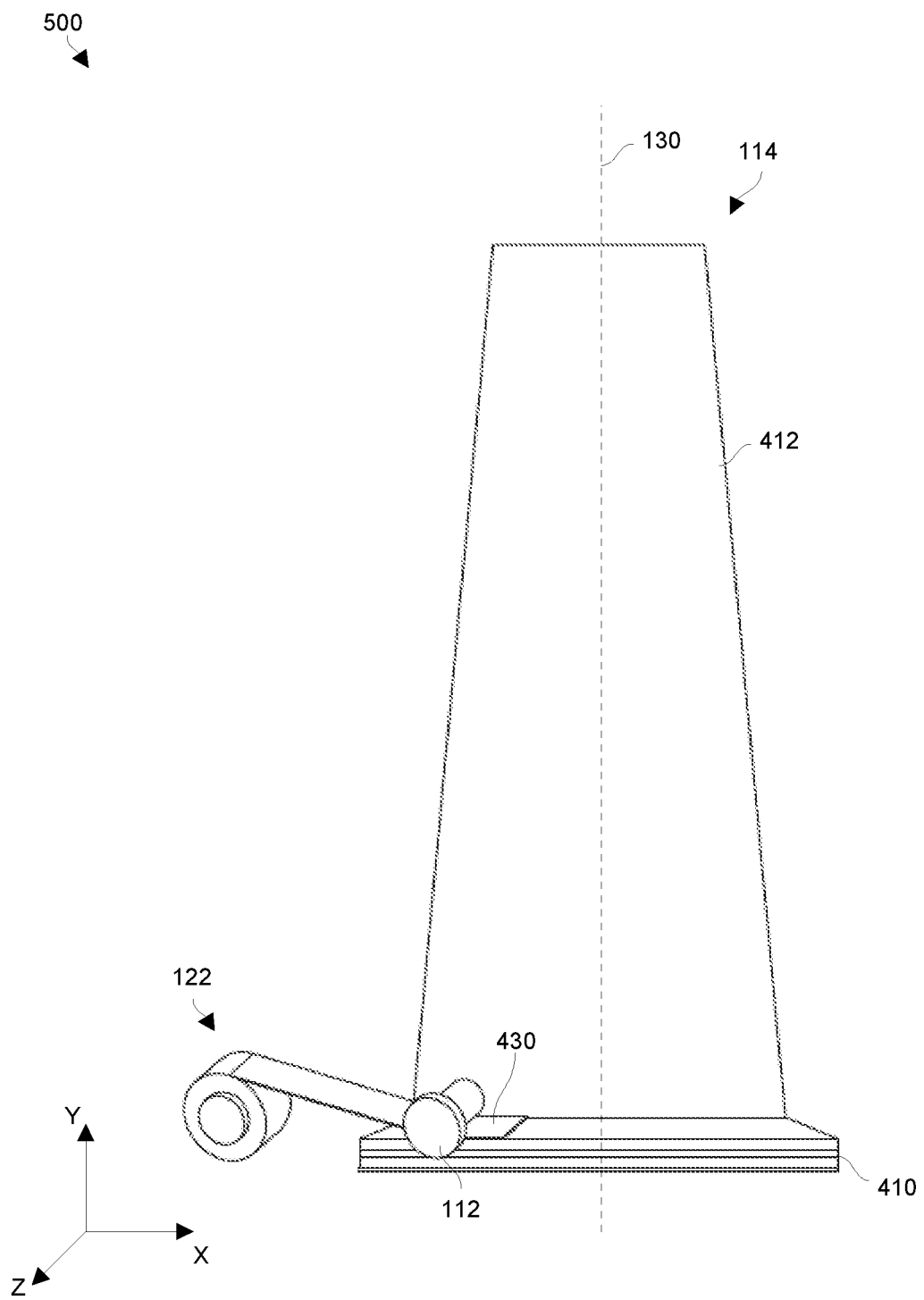
FIG. 5 is a side view of certain equipment in accordance with certain embodiments.
Figure 7:
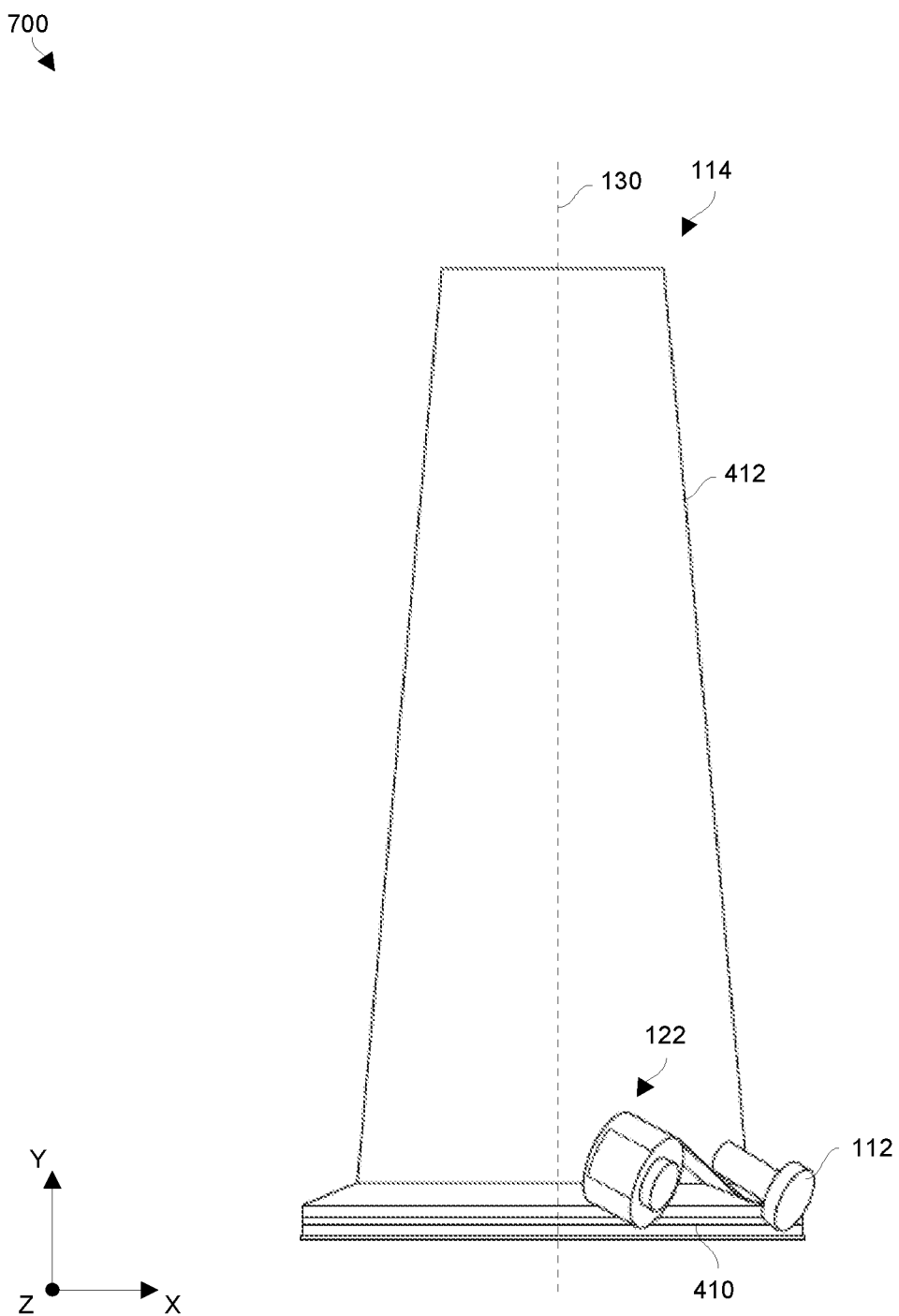
FIG. 7 is another side view of certain equipment in accordance with certain embodiments.

As best seen in FIGS. 5 and 7, the lower sloped portion 410 provides a surface that is slightly pitched at an angle rather than perpendicular to the central axis 130. In some arrangements, the surface of the lower sloped portion 410 is within the range of 100 degrees and 125 degrees from the central axis 130 (e.g., at a 22.5 degree angle from the X-Z plane).

Also, as best seen in FIGS. 5 and 7, the elongated tapered portion 412 is widest where the elongated tapered portion 412 is nearest the lower sloped portion 410. The elongated tapered portion 412 then narrows in the positive Y-direction. Accordingly, cross-sections perpendicularly through the center axis 130 (i.e., within the X-Z plane) are wider closer to the lower sloped portion 410 and narrower further away from the center axis 130.

As mentioned earlier, the tape deployment head 112 deploys the tape 120 from the tape supply 122 relative to the conical tool structure 114. As will be explained in further detail later, the tape 120 may be formed of carbon/carbon composite material, phenolic resin-carbon composite material, or the like that provides high thermal stability and protection. Such material may have carbon fibers arranged in a bias (or similar) pattern to provide an effective combination of strength and heat resistance for the formed object.

To facilitate tape deployment, the tape deployment head 112 may have a shape that optimizes application of compaction force on to the width of the tape 120 and precise steering of the tape 120 such that an inner edge of the tape 120 just contacts (or is immediately adjacent to) the elongated tapered portion 412 of the conical tool structure 114. Due to the shape of the tape deployment head 112, such deployment is effective regardless of the cross-section width (i.e., wide or narrow) of the elongated tapered portion 412 due to high precision control from the tape controller 110 (FIG. 1).

Figure 6:
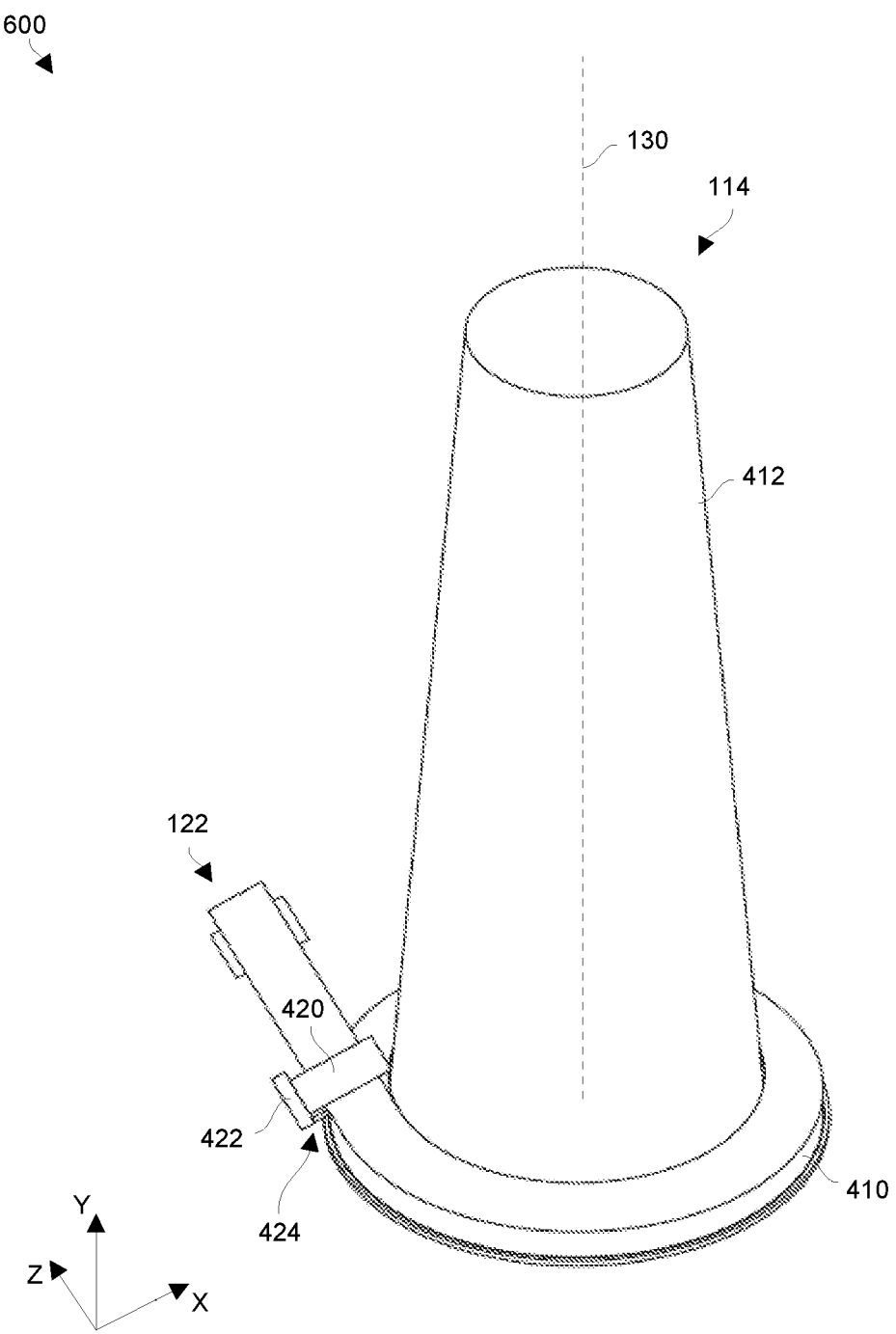
FIG. 6 is another perspective view of certain equipment in accordance with certain embodiments.

In accordance with certain embodiments, the tape deployment head 112 includes a spool (or core) portion 420, an outer guide 422, and a detent (or catch) member 424 (e.g., see FIG. 6). The spool portion 420 is constructed and arranged to apply force on one flat side of the tape 120 to enable the other flat side of the tape 120 to adhere to the surface beneath. The outer guide 422 restricts the outer edge of the tape 120 thus preventing the tape from 120 from inadvertently sliding off of the tape deployment head 112. The detent member 424 further controls (e.g., secures and aligns) the tape 120 with the tape deployment head 112 during tape deployment.

At this point, it should be understood that the various ATL components described above in connection with FIGS. 1 through 3 may be utilized for at least part of the tape controller 110 to maneuver the tape deployment head 112 and the conical tool structure 114 relative to each other. In some arrangements, the tape deployment head 112 remains stationary and the tape controller 110 moves the conical tool structure 114. In other arrangements, the conical tool structure 114 remains stationary and the tape controller 110 moves the tape deployment head 112. In yet other arrangements, the tape controller 110 moves both the tape deployment head 112 and the conical tool structure 114.

Moreover, it should be understood that the conical tool structure 114 is shown in FIGS. 4 through 7 as pointing vertically (i.e., with the central axis 130 extending along the Y-axis). However, it should be further understood that nothing precludes the other orientations for the conical tool structure 114 (e.g., the conical tool structure 114 may be aligned horizontally, obliquely, etc.).

Figure 4:
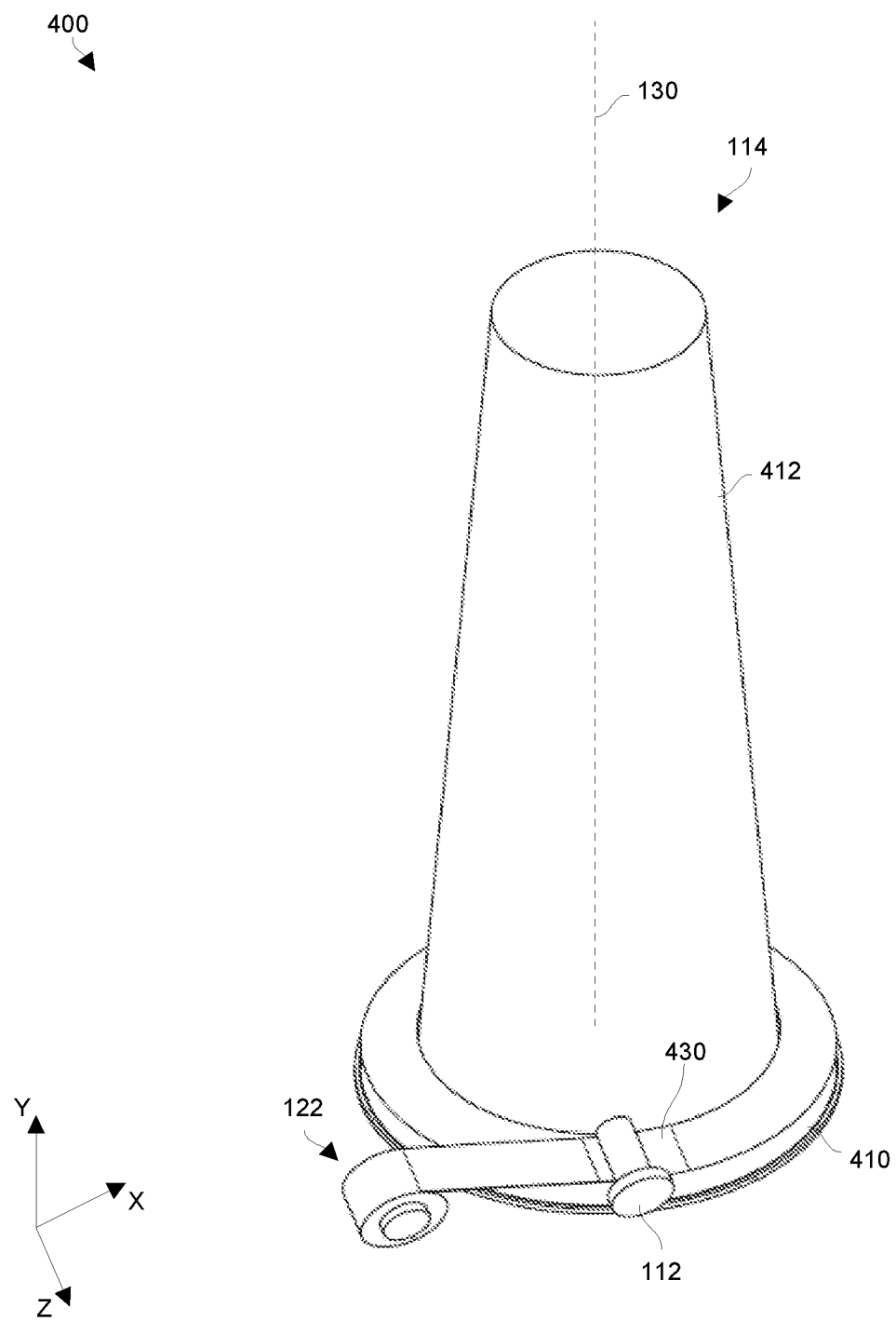
FIG. 4 is a perspective view of certain equipment in accordance with certain embodiments.

As best seen in FIGS. 4 and 5, a starting section (or portion) 430 of the tape 120 is received (e.g., unrolled) from the tape supply 122 and positioned in contact with the conical tool structure 114. In particular, the starting section 430 of the tape 120 is laid flat onto the lower sloped portion 410 of the conical tool structure 114 with a first edge of the tape 120 contacting the elongated tapered portion 412 and a second edge of the tape 120 facing outward from the elongated tapered portion 412.

The width of the lower sloped portion 410 may be sufficiently wide such that the width of the tape 120 (from edge to edge) fully lays over the surface of the lower sloped portion 410. However, in some arrangements, the width of the lower sloped portion 410 sufficiently matches the width of the tape 120 to enable the outer guide 422 of the tape deployment head 112 to extend over the lower sloped portion 410 to avoid interference.

In accordance with certain embodiments, the tape controller 110 lays the tape 120 with consistently high precision placement, tension, compaction, etc. to provide high quality and uniformity. In particular, the tape controller 110 moves the tape deployment head 112 such that the tape deployment head 112 presses the flat surface of the tape 120 toward the lower sloped portion 410 while the tape 120 continues to unroll from the tape supply 120 and onto the conical tool structure 114. Along these lines, the tape deployment head 112 may be pitched to match the pitch angle of the lower sloped portion 410 as the tape controller 110 winds the tape 120 around the conical tool structure 114 (FIGS. 4 through 7).

Eventually, the tape controller 110 fully encircles the conical tool structure 114 with the tape 120 and continues thus building a new layer of tape 120 over the existing layer. During this operation, the tape deployment head 112 maintains compaction pressure on the width of the tape 120 to promote bonding between the layers. Moreover, during such operation, various componentry may treat the tape 120 to optimize deployment (e.g., heating, cooling, humidity, tension, etc.) as explained earlier in connection with FIGS. 1 through 3. Further details will now be provided with reference to FIGS. 8 and 9.

Figure 8:
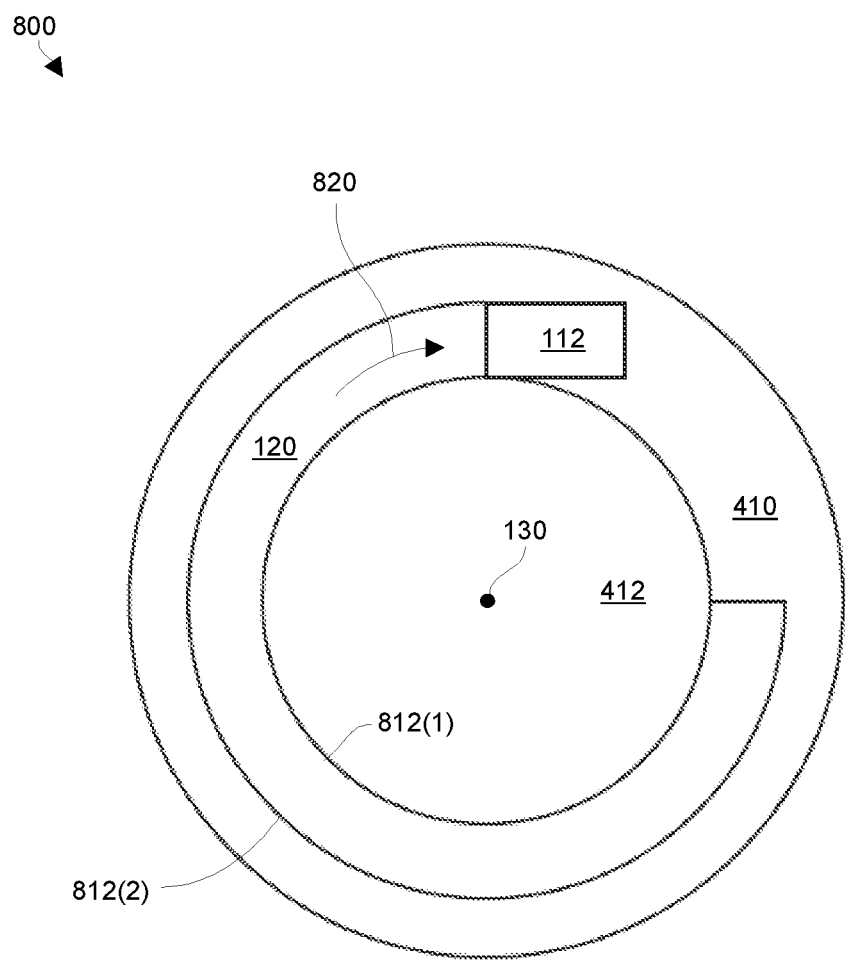
FIG. 8 is a top view of certain equipment in accordance with certain embodiments.
Figure 9:
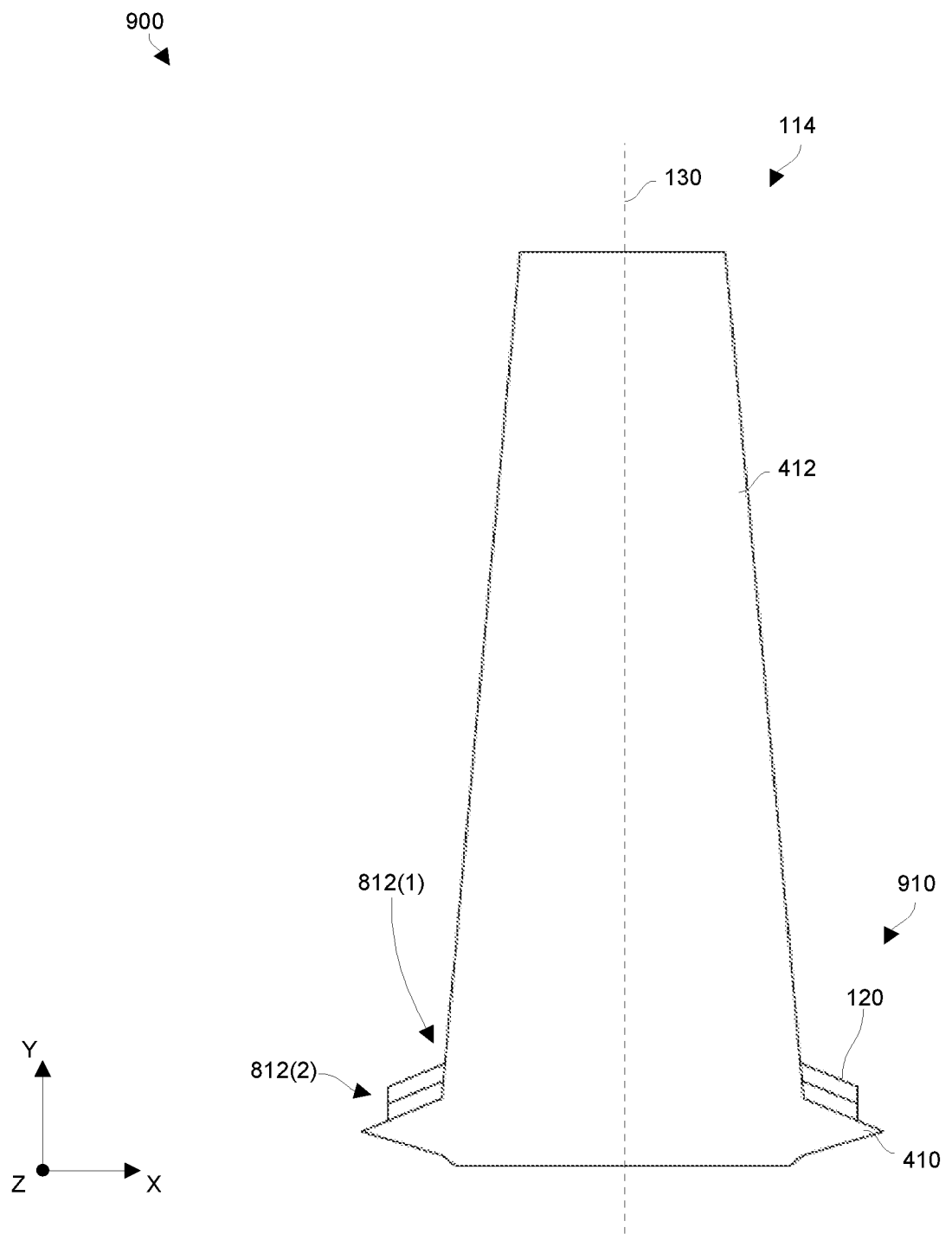
FIG. 9 is cross-sectional view of certain equipment in accordance with certain embodiments.

FIGS. 8 and 9 show certain details regarding how the tape 120 is laid in accordance with certain embodiments. FIG. 8 shows a top view 800 of some of the tape 120 laid on to the conical tool structure 114 (less than a single layer). FIG. 9 shows a cross-sectional side view 900 of an object 910 having multiple layers of the tape 120.

Although the lower sloped portion 410 of the conical tool structure 114 may provide a surface having a width that closely the width of the tape 120 in accordance with certain embodiments, the surface of the lower sloped portion 410 is shown in FIGS. 8 and 9 as having a greater width than that of the tape 120 to better illustrate certain details regarding how the tape 120 is laid. In some embodiments, the lower sloped portion 410 of the conical tool structure 114 has a greater width than that of the tape 120 as shown in FIGS. 8 and 9.

As shown in FIGS. 8 and 9, the tape deployment head 112 encircles the conical tool structure 114 (FIG. 8) to deploy the tape 120 such that a first edge 812(1) of the tape 120 just touches (or abuts) the elongated tapered portion 412 of the conical tool structure 114 and a second edge 812(2) of the tape 120 extends away from the elongated tapered portion 412 of the conical tool structure 114 (FIG. 9).

As best seen in FIG. 9 and in accordance with certain embodiments, the surface of the lower sloped portion 410 has a slight pitch (i.e., the surface is not perpendicular to the central axis 130). For example, the pitch may be within the range of 10 to 40 degrees such as 22.5 degrees from horizontal. As the modified ATL process continues to form an object 910 having multiple layers of the tape 120, the layers stack and continue to have a slight pitch.

Figure 10:
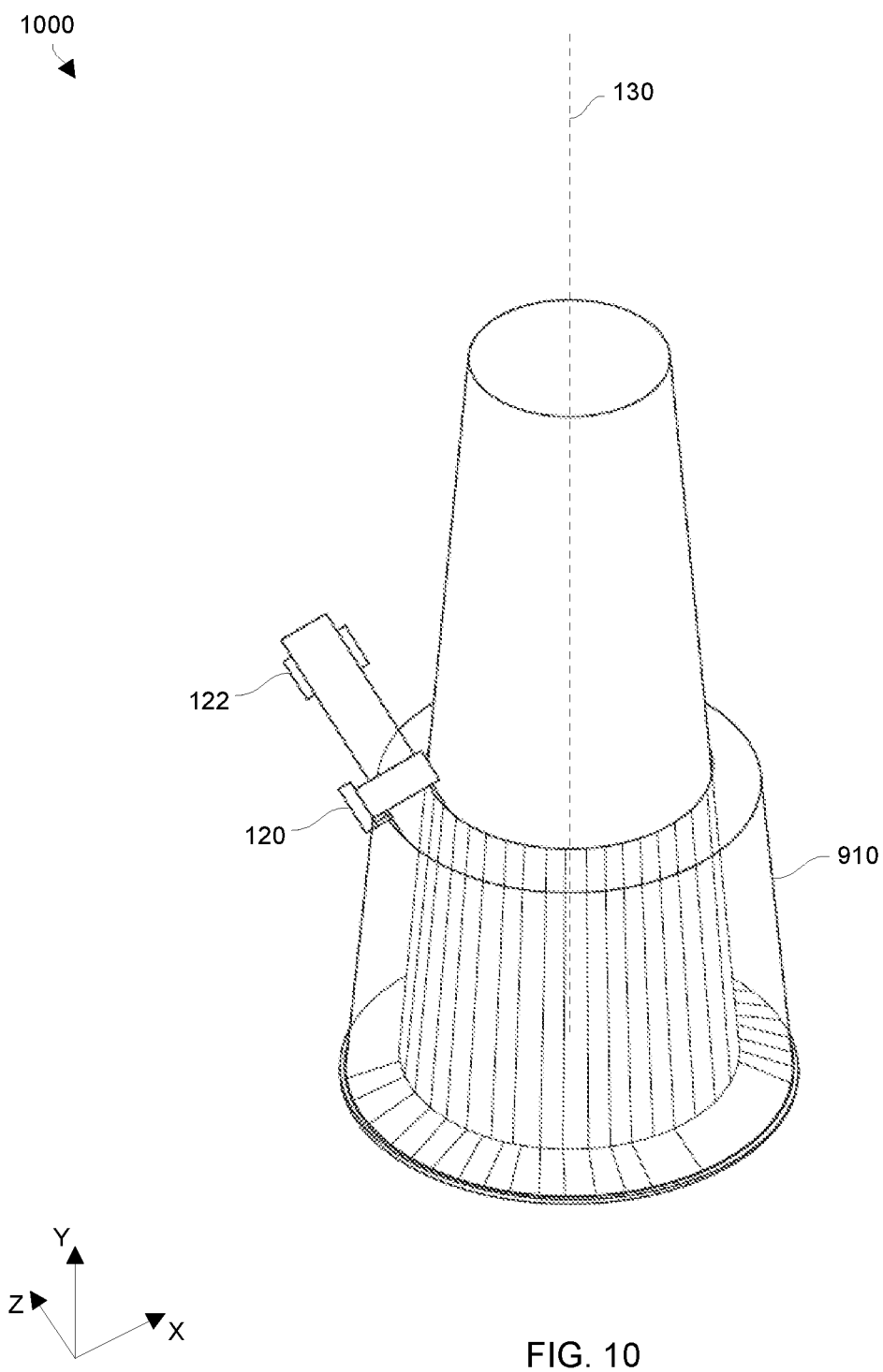
FIG. 10 is a perspective view of certain object details in accordance with certain embodiments.
Figure 11:
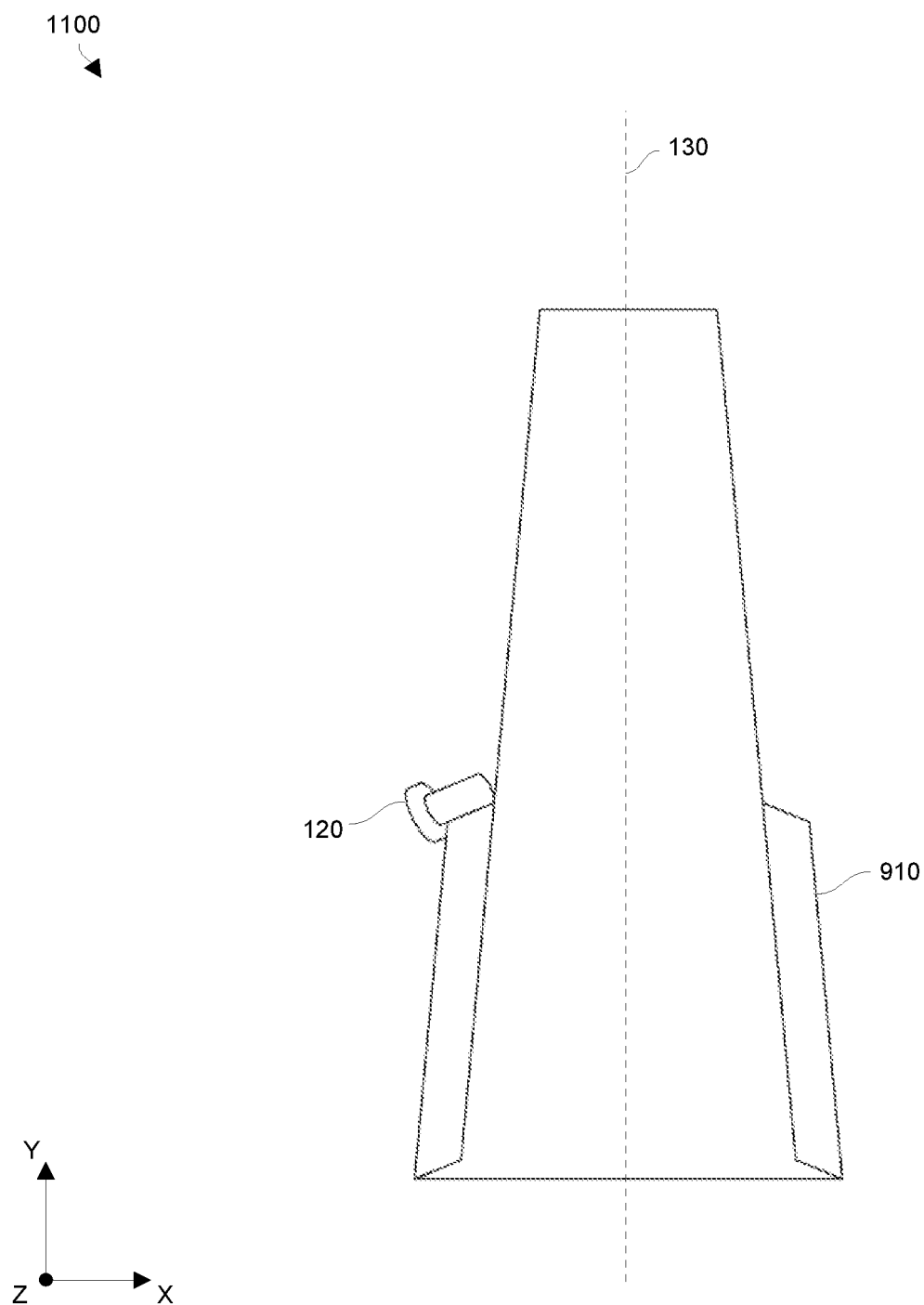
FIG. 11 is a cross-sectional view of certain object details in accordance with certain embodiments.
Figure 12:
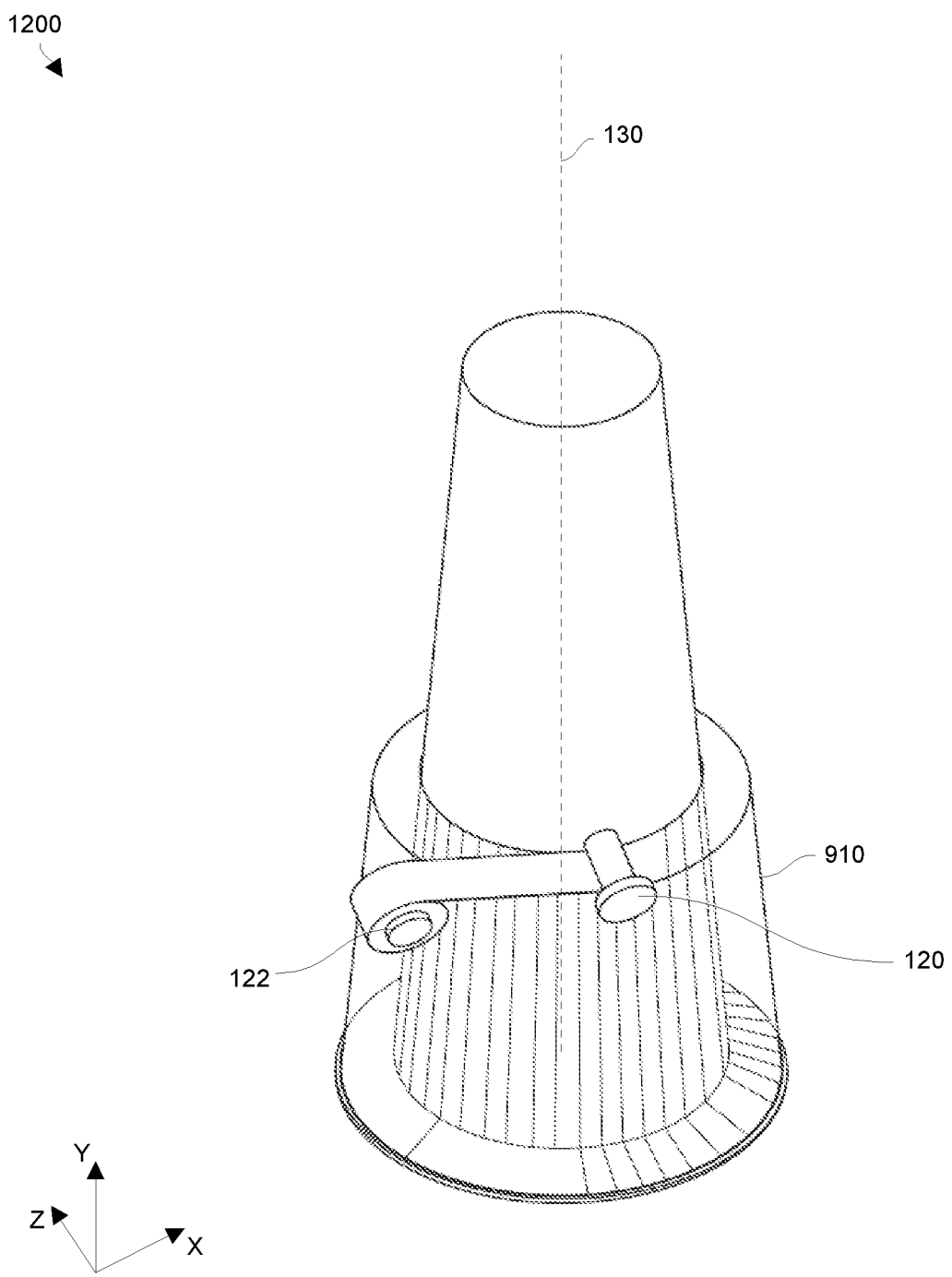
FIG. 12 is another perspective view of certain object details in accordance with certain embodiments.
Figure 13:
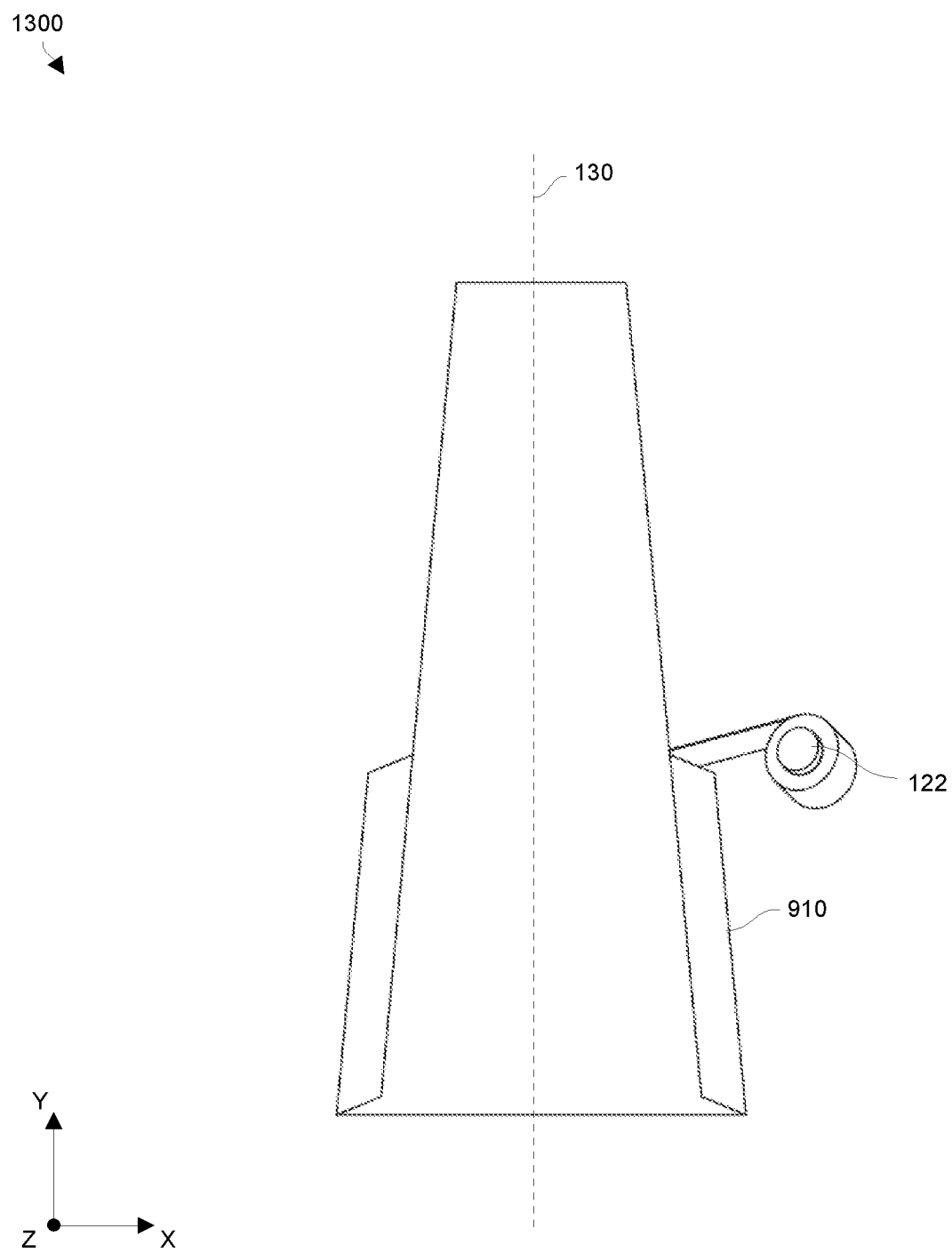
FIG. 13 is another cross-sectional view of certain object details in accordance with certain embodiments.

FIGS. 10 through 13 show further details regarding how the tape 120 is laid in accordance with certain embodiments. FIG. 10 is a perspective view 1000 showing the tape deployment head 112 slightly tilted guide the tape 120 around the elongated tapered portion 412 of the conical tool structure 114. FIG. 11 is a cross-sectional side view 1100 showing the tape deployment head 112 slightly tilted guide the tape 120 around the elongated tapered portion 412 of the conical tool structure 114. FIG. 12 is a perspective view 1200 showing the tape deployment head 112 in front of the elongated tapered portion 412 of the conical tool structure 114 as the tape supply 122 continues to feed the tape 120 for deployment. FIG. 13 is a cross-sectional side view 1300 showing how tension may be maintained in the tape 120 during deployment (e.g., via rollers, via the tape supply 122, via other robotics, combinations thereof, etc.).

As shown in FIGS. 10 through 13, the object 910 formed from the stacked layers of the tape 120 continues to build in the Y-direction. FIGS. 10 and 12 show the object 910 in transparent form to better illustrate the relation of the object 910 with the conical tool structure 114. As shown, the outer surface of the object 910 mirrors the shape of the elongated tapered portion 412 of the conical tool structure 114. Further details will now be provided with reference to FIGS. 14 and 15.

Figure 14:
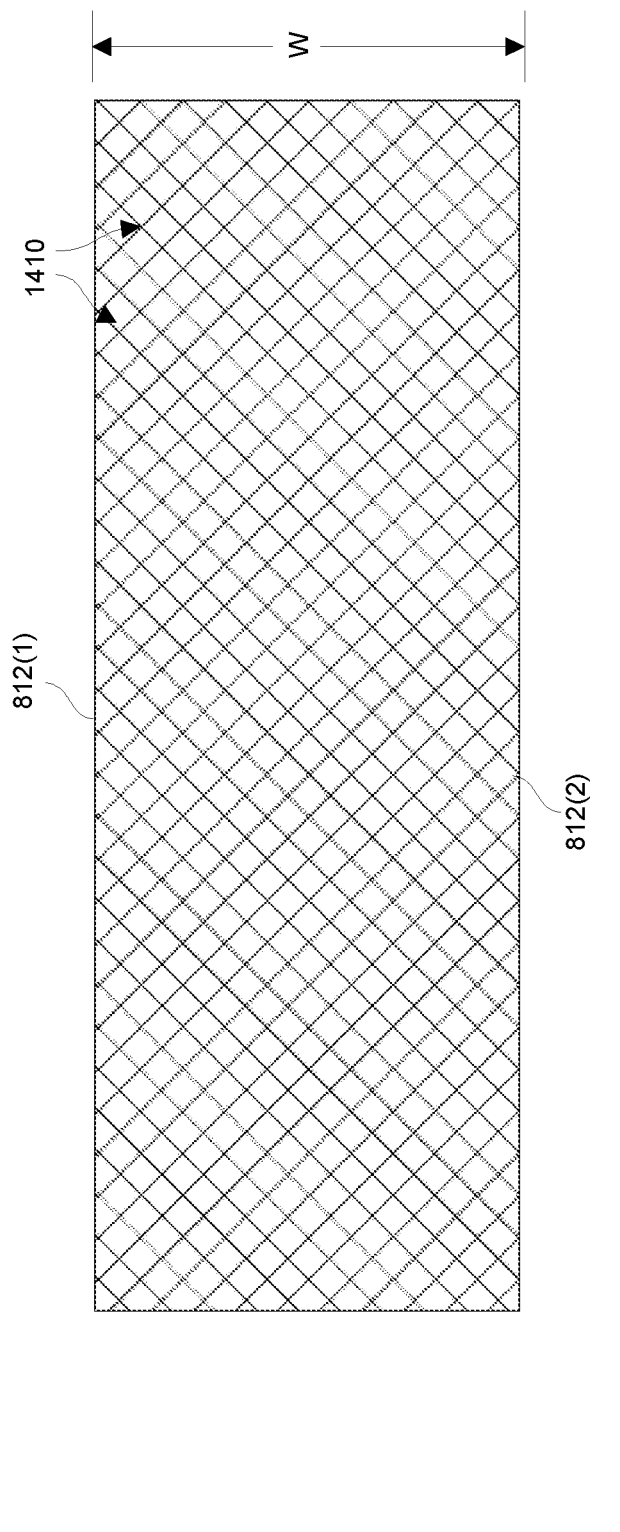
FIG. 14 is a top view of example tape in accordance with certain embodiments.
Figure 15:
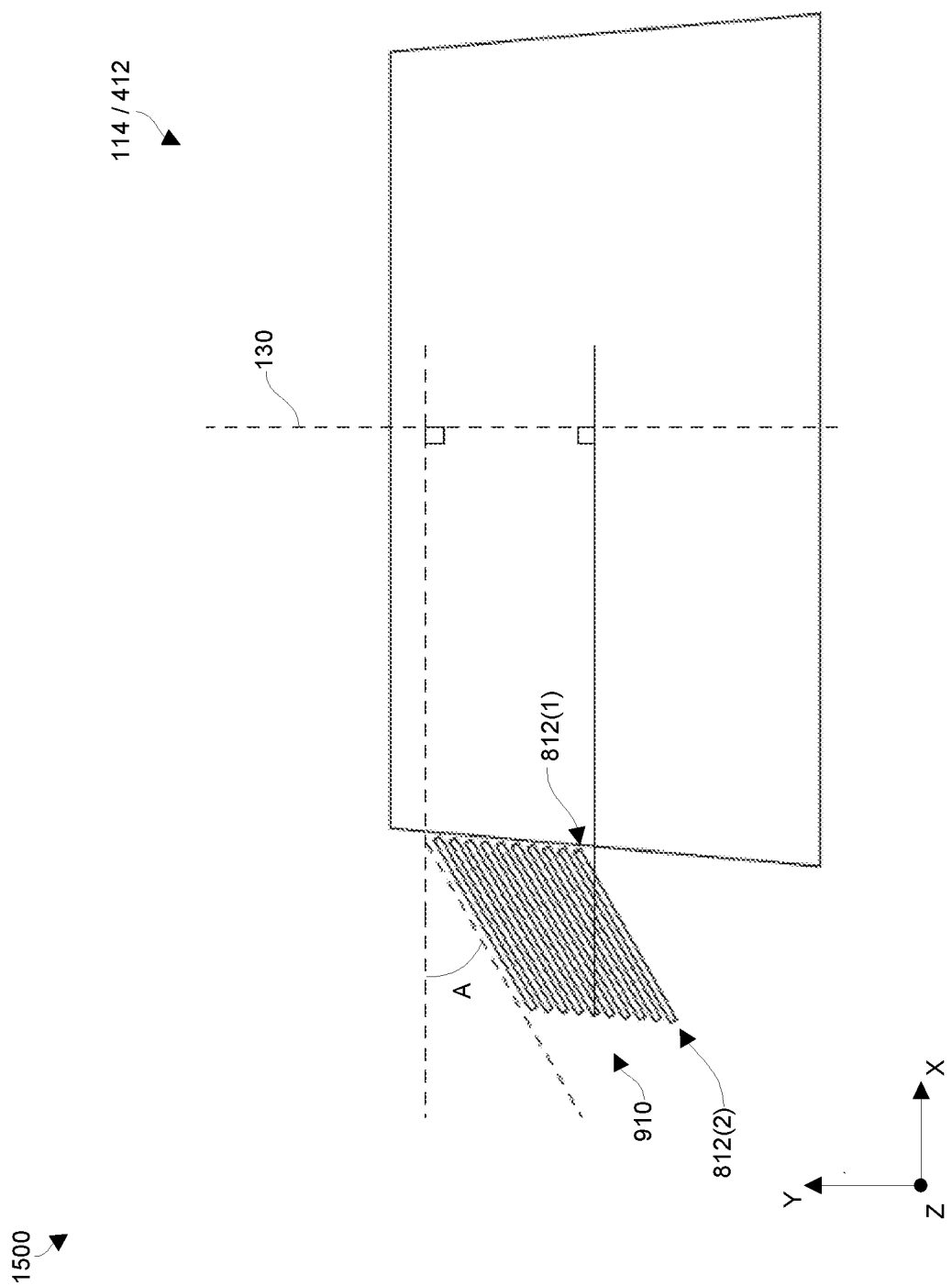
FIG. 15 is a cross-sectional view of certain object details in accordance with certain embodiments.

FIGS. 14 and 15 provide further details regarding the modified ATL process in accordance with certain embodiments. FIG. 14 shows a top view 1400 of a portion of a tape 120 that is suitable for use in the modified ATL process in accordance with certain embodiments. FIG. 15 is a cross-sectional side view 1500 of a portion of the object 910 that is formed from deploying the tape 120 on the conical tool structure 114 in accordance with certain embodiments.

As mentioned earlier, the tape 120 has a bias pattern 1410 in accordance with certain embodiments. Along these lines, the tape 120 may be formed of carbon/carbon composite material, phenolic resin-carbon composite material, or the like that provides high thermal stability and protection. It should be understood that such material may be impregnated with oriented carbon fibers and perhaps other materials (e.g., ceramics, other ablators, etc.), and that various automated componentry may optimize deployment such as position sensing, pressure sensing, tension sensing, heating, cooling, and so on (also see FIGS. 1 through 3).

As shown in FIG. 14, carbon fibers 1410 within the tape 120 cross at 45 degree angles within the bias pattern 1410. Accordingly, the carbon fibers 1410 are longer than the width (W) of the tape 120 as measured between the outer edges 812(1), 812(2) (also see FIG. 11). As a result, any heat conducted by the carbon fibers has a longer distance to travel using the bias pattern than simply the width (W) as would be possible with certain other fiber patterns such as a lateral cross grain pattern that would orient the fibers radially where fibers within the tape would be short and extend laterally from edge to edge.

As shown in FIG. 15, the layers of the tape 120 are pitched at an angle (A) from horizontal (i.e., from a plane that is perpendicular to the central axis 130 defined by the conical tool structure 114. Such an angle (e.g., 22.5 degrees from horizontal) may fall within a predefined range (e.g., between 20 and 25 degrees). Accordingly, lateral heat conductivity (e.g., measured horizontally through the X-axis) must penetrate multiple layers of the tape 120. Accordingly, the layered geometry provided by the conical composite object 910 serves well to shield heat. Further details will now be provided with reference to FIG. 16.

Figure 16:
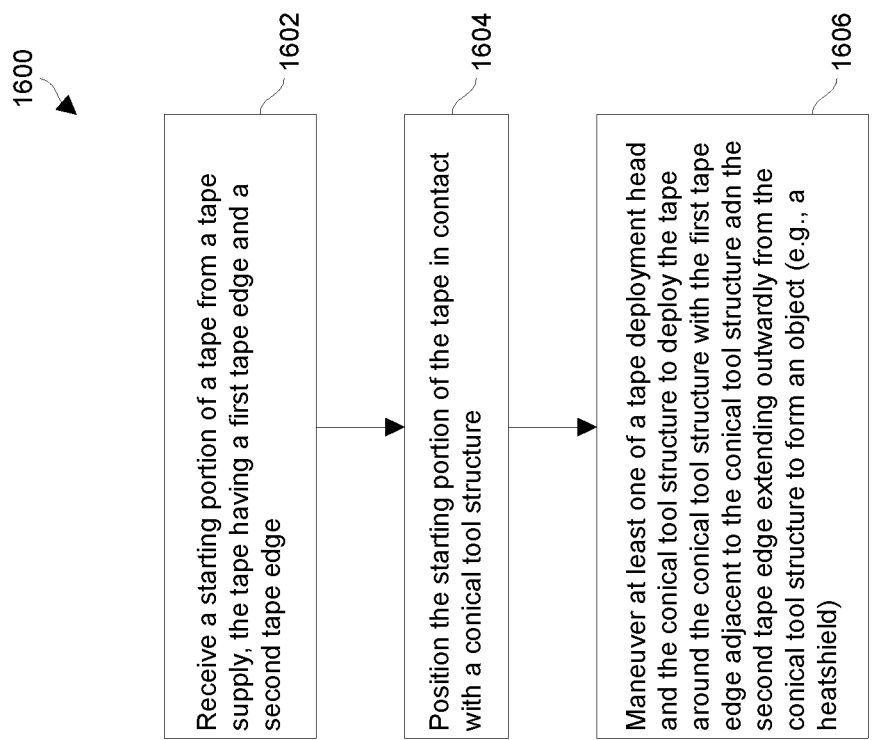
FIG. 16 is a flowchart of a procedure for providing a conical composite object such as a heatshield in accordance with certain embodiments.

FIG. 16 is a flowchart of a procedure 1600 for providing a conical composite object or component such as a heat-shield in accordance with certain embodiments. Such a procedure may be performed by specialized equipment (e.g., also see the various componentry in FIGS. 1 through 3).

At 1602, the specialized equipment receives a starting portion of a tape from a tape supply. The tape has a first tape edge and a second tape edge (e.g., see FIGS. 8, 14, and 15).

At 1604, the specialized equipment positions the starting portion of the tape in contact with a conical tool structure (e.g., see FIGS. 4 and 5).

At 1606, the specialized equipment, after the starting portion of the tape is positioned in contact with the conical tool structure, maneuvers at least one of (i) a tape deployment head relative to the conical tool structure and (ii) the conical tool structure relative to the tape deployment head to deploy the tape around the conical tool structure with the first tape edge adjacent to conical tool structure and the second tape edge extending outwardly from the conical tool structure to form the object (e.g., see FIGS. 10 through 13).

Deployment of the tape 120 continues in this shingled fashion (e.g., see FIG. 15) to build up the structure of the component. In accordance with certain embodiments, the material used for building a shingled heatshield involves prepreg manufactured with a bias angle, as compared to a tape having broadgood fiber orientation in which fibers run laterally along the length of the tape and perpendicularly to the edges of the tape. With bias fiber orientation/construction, the structure provides functional performance that is preferred for certain types of heatshield applications. Such bias fiber construction also allows for the reinforced tape to stretch, i.e., conform to the shingled angle (between 45+/− degrees or similar) (e.g., see FIGS. 14 and 15).

As described above, improved techniques involve modified (or enhanced) automated tape layering (ATL) of a tape 120 over a conically shaped tool structure 114 (e.g., a template or form). With this modified ATL process, high tape placement precision, consistent pressures, and tape steering are achievable. Such techniques may deploy the tape 120 over the tool 114 to create an object 910 such as a conical heatshield. Along these lines, such techniques enable one edge 812(1) of the tape 120 to be precisely laid directly in contact with the tool 114 such that multiple layers may be built with the other edge 812(2) of the tape 120 facing outward from the tool 114. Accordingly, such techniques enable creation of substantially thicker heatshields with improved uniformity and quality.

With features provided by modified ATL such as high tape placement precision, consistent pressures, and tape steering, manufacture of conical composite components having high quality and consistency are now achievable. Accordingly, the capabilities of ATL are now expanded beyond simply using ATL on flat areas and cylindrical objects.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical.

As explained above, some of the improvements relate generally to the field of strategic materials, processes, and systems. Some improvements relate to heatshields and similar objects for hypersonic glide vehicles, cruise missiles, and the like.

It should be understood that conventional carbon/phenolic heatshields are manufactured by using a bias reinforced (i.e., +45 degree) prepreg fabric (i.e., 'tape') that is 'tape wrapped' using a well-established process. Tape wrapping applies the prepreg beginning at the base of the part circumferentially at an angle and builds up the entire side of the part.

The conventional process is typically performed on a horizontal rotating bed, and is manually intensive as the operator guides the bias tape in place. The conventional process has been in production since the 1970's and can still be applied to hypersonic heatshields today.

A tape wrapped heatshield built using a conventional approach would be less than one inch in wall thickness. However, for some hypersonic applications, the need arises for a much thicker heatshield, multiple times greater than are historically manufactured with the process. Unfortunately, the manual tape wrapping process provides a nonuniform part consolidation, and as a result, thicker parts are prone to delamination.

Automated tape laying, or ATL, of composite prepreg is a robotic process that provides quality, uniform consolidation of prepreg as it is placed on a tool. ATL is typically used on flat areas and cylindrical components. To be utilized on a conical heatshield, two process modifications are required. First, because one edge of the tape is laid directly in contact with the tool, a 'head' of a conventional ATL machine must be configured to allow for contact to be made, which can be done by removing the guide on one side of a head with a spool geometry while ensuring, with any number of methods, that the tape continues to spool off the head in a controlled fashion. One such method would be utilization of a dual roller on the side opposite where contact is made with the tool, so that the prepreg is held during rolling to prevent slippage. There are many other basic mechanical processes that can be utilized to perform the same function.

The second process modification required to ATL a heatshield is a form of 'tape steering', where the tape is controlled to take a curved path as it is laid onto the tool to the curvature of the ever-changing radius of the tool. Tape steering is performed by a combination of software and tool head modifications. Although steering may be performed in limited production on flat and slightly contoured shapes, such steering has not been performed on a conical part.

In accordance with certain embodiments, certain techniques (methods, apparatus, and systems) involve modified ATL. Such techniques combine the producibility of the ATL process with a modified robotic head to allow direct insertion onto the tool surface plus the use of tape steering to achieve a high quality heatshield for a hypersonic environment.

In traditional ATL, the tape is at the center of the roller, but not at the edge (e.g., see FIG. 3). For winding directly onto a conical part, the tape would need to be at the edge. This could be accomplished by use of a dual roller head to keep the tape in compaction and thereby prevent sliding along the width of the roller during laydown. There are other methods to prevent sliding as well.

In accordance with certain embodiments, specialized equipment is capable of providing a heatshield or similar object. Such equipment includes a tool, a head, and a tape supply (e.g., see FIGS. 1 and 4). Other componentry may be included such as a controller/actuators, support members, etc. (e.g., see FIGS. 2 and 3).

In accordance with certain embodiments, the tool has a conical shape and serves as a structure on which tape can be deployed. In particular, the tool includes a base portion and a conical portion that extends from the base portion in the Y-direction.

The base portion of the tool is constructed and arranged to provide a starting surface on which tape can be laid such that the width of the tape contacts the base portion as the tape is initially unrolled from the tape supply and such that an inner edge of the tape contacts the conical portion. It should be noted that, when the tape is a bias fabric, the tape will essentially spread open to allow for conformability to both the smaller diameter along the tool surface to the larger diameter along the OD of the heatshield surface.

The head (which may be controlled robotically) is constructed and arrange to hold the tape in proper orientation and position relative to the tool as the tape is delivered to the tool from the tape supply. In some arrangements, the head includes an inner core, an outer flange and a tab (or detent).

The inner core of the head (or bobbin) supports the width of the tape. The outer flange retains the tape in proper position relative to the inner core (e.g., prevents the tape from sliding off the head). The tab facilitates keeping the tape in proper position relative to the core as well as keeps the tape in contact with the inner core.

Accordingly, the head is able to maintain tape tension (e.g., to prevent wrinkling, kinking, etc.), positions the edge of the tape along the conical portion of the tools, and provides compaction (e.g., presses the tape in the downward direction, see the negative Y-direction in FIG. 4).

In accordance with certain embodiments, control componentry (e.g., robotics, control circuitry, etc.) provides precision steering to maintain proper positioning of the tape as the tape is initially deployed and as the tape continues to be deployed to build up the heatshield. Along these lines, after an initial tape layer is provided on the tool, the componentry continues to deploy the tape to provide a second layer, a third layer, and so on. During this laying of the tape, precision steering ensures that the edge of the tape properly contacts the conical portion of the tool such that there are no gaps and such that the non-edge regions (i.e., the width portion) of the tape does not roll up onto the conical portion of the tool. Rather, the tape is accurately guided (by the head controlled by robotics, software, etc.) around the conical portion for precise proper positioning.

Such tape layers make contact with adjacent tape layers below and/or above. Additionally, the inner edge of the tape continues to contact the conical portion of the tool.

In accordance with certain embodiments, the heatshield (which may remain open at the top) is built up to include layers of tape which have been wound around the tool. Such layers may be pitched at an angle which follows a taper defined by the base portion of the tool.

The inner edge of the tape contacts the conical portion of the tool. Accordingly, the built up layers of tape form, as the heatshield, a conical structure that narrows from the base portion toward the top of the tool.

In accordance with certain embodiments, the tape is deployed in a clockwise direction as viewed from the top of the tool. However, other tape directions are suitable such as deploying the tape in the counterclockwise direction as viewed from the top of the tool.

It should be understood that the tape includes fibers (or filaments) running in one or more directions. In accordance with certain embodiments and as shown in the figure below, the tape may have a bias pattern in which the fibers run at angles (e.g., +/−45 degrees) from edge to edge along the width. Such a bias pattern (or weave) of the tape provides superior heat dissipation compared to tapes having a fiber pattern which includes fibers running perpendicular to the width (i.e., straight across from edge to edge) such as that of a fabric pattern. Additionally, the bias pattern of the tape provides superior strength compared to that of simple tape pattern in which the fibers only run lengthwise in the feed direction of the tape.

It should be understood that the techniques described herein may accommodate a relatively wide tape. For example, the pattern shown in FIG. 14 may be for a 3 inch wide tape with fibers at 45 degrees.

For illustration purposes, FIG. 15 shows an example cross-section of deployed tape that is distributed around a tool. As shown, the thickness of the heatshield is determined at least in part by the width and layering of the tape. Moreover, any line through a perpendicular cross-section, crosses multiple layers of tape. Accordingly, the heatshield provides an advantageous combination of strength, durability, an insulation.

In some arrangements, the height of the tool within a range of 2 feet to 6 feet tall. For example, the tool may be 2 feet tall, 3 feet tall, 4 feet tall, and so on.

In some arrangements, the plies of the tape are approximately 0.010 inches thick although other ply thicknesses are suitable for use.

In some arrangements, the tape includes multiple plies (e.g., 4, 6, 8, 10, etc.). Accordingly, a 10× tape may provide a thickness of 0.1 inches.

In some arrangements, the width of the tape falls within a range of one to five inches (e.g., 3.5 inches, 4 inches, etc.). Accordingly, a heatshield produced using a 3.5 inch wide tape with a pitch of 22.5 degrees may provide a heatshield thickness of approximately 2.8 inches.

It should be understood that other dimensions, geometries, orientations, etc. are suitable for use. For example, in some arrangements, the flare of the conical portion of the tool is at a steep angle such as 75 degrees.

However, other angles and/or shapes are suitable for use as well. For example, the tool may include steps, different taper angles, etc. to provide a custom shape that mirrors the contour of the device to be protected.

Furthermore, it should be understood that the process may control other aspects as well. Along these lines, the process may further include the application of heat (e.g., via a laser, via blown gas, etc.), humidity control, and so on. Moreover, the heatshield may be formed in a controlled amount of time to optimize bonding between layers, curing, cutting, sanding, treating, and so on.

While various embodiments of the invention have been particularly shown and described, it will be understood by those skilled in the art that various changes in form and details may be made therein without departing from the scope of the invention. Support for such combinations, variants and permutations is considered to exist in this document.

What is claimed is:

1. A method of using automated tape layering (ATL) equipment to produce a heatshield, the ATL equipment including a tape deployment head and a tape controller, the method comprising the steps, performed using the tape deployment head under automated control of the tape controller, of:
   receiving a starting portion of a tape from a tape supply, the tape having a first tape edge and a second tape edge;
   positioning the starting portion of the tape in contact with a conical tool structure; and
   after the starting portion of the tape is positioned in contact with the conical tool structure, maneuvering at least one of (i) the tape deployment head relative to the conical tool structure, the tape deployment head being constructed and arranged to deploy tape around the conical tool structure, and (ii) the conical tool structure relative to the tape deployment head, to deploy the tape around the conical tool structure with the first tape edge adjacent to the conical tool structure and the second tape edge extending outwardly from the conical tool structure to form the heatshield;
   wherein the tape controller includes a robotic assembly and associated control circuitry,
   wherein maneuvering includes:
   using the robotic assembly under control of the control circuitry to robotically move the conical tool structure and the tape deployment head relative to each other to precisely guide the tape around the conical tool structure; and wherein robotically moving the conical tool structure and the tape deployment head relative to each other includes:

receiving a set of sensing signals indicating current position of the conical tool structure and the tape deployment head relative to each other, and based on the set of sensing signals, applying the tape under pressure to form the heatshield.

2. The method of claim 1 wherein the conical tool structure is conical about a central axis;

wherein a first cross-section through a first portion of the conical tool structure has a first width, the first cross-section being perpendicular to the central axis;

wherein a second cross-section through a second portion of the conical tool structure has a second width that is different from the first width, the second cross-section being perpendicular to the central axis;

wherein positioning the starting portion of the tape in contact with the conical tool structure includes:

placing the starting portion of the tape in contact with the first portion of the conical tool structure.

3. The method of claim 2 wherein the second width is narrower than the first width; and wherein maneuvering includes:

forming layers of the tape that wrap around the conical tool structure and extend from the first portion to the second portion.

4. The method of claim 3 wherein the conical tool structure further includes a sloped portion that defines an incline from the first portion; and wherein forming the layers includes:

orienting the layers at the incline defined by the sloped portion of the conical tool structure.

5. The method of claim 4 wherein orienting the layers at the incline includes:

layering the tape at a pitch within the range of 100 degrees and 125 degrees from the central axis.

6. The method of claim 4 wherein the tape includes fibers arranged in a bias pattern; and wherein forming the layers includes:

positioning the layers with the fibers extending outwardly from the conical tool structure in non-radial directions.

7. The method of claim 4 wherein the tape includes pre-impregnated material; and wherein forming the layers includes:

positioning the first edge of the tape in contact with the conical tool structure and pressing the layers into contact with each other to promote pre-impregnated material bonding.

8. The method of claim 1 wherein positioning the starting portion of the tape in contact with the conical tool structure includes:

moving the tape deployment head which is loaded with the starting portion of the tape toward the conical tool structure to deposit the starting portion of the tape onto the conical tool structure.

\* \* \* \* \*